(12) United States Patent
Kugimiya et al.

(10) Patent No.: US 10,266,415 B2
(45) Date of Patent: Apr. 23, 2019

(54) METHOD FOR PRODUCING SILICA AEROGEL

(71) Applicant: Panasonic Intellectual Property Management Co., Ltd., Osaka (JP)

(72) Inventors: Kazuma Kugimiya, Osaka (JP); Takumasa Yamada, Osaka (JP); Hideyuki Ando, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/129,054

(22) PCT Filed: Jan. 13, 2015

(86) PCT No.: PCT/JP2015/000103
§ 371 (c)(1),
(2) Date: Sep. 26, 2016

(87) PCT Pub. No.: WO2015/151371
PCT Pub. Date: Oct. 8, 2015

(65) Prior Publication Data
US 2017/0101321 A1    Apr. 13, 2017

(30) Foreign Application Priority Data
Mar. 31, 2014  (JP) .................. 2014-070750

(51) Int. Cl.
*C01B 33/158* (2006.01)
*C01B 33/16* (2006.01)
*C01B 33/155* (2006.01)

(52) U.S. Cl.
CPC ........ *C01B 33/1585* (2013.01); *C01B 33/155* (2013.01); *C01B 33/16* (2013.01)

(58) Field of Classification Search
CPC .............. C01B 33/155; C01B 33/1585; C01B 33/158; C01B 33/157; C01B 33/16
See application file for complete search history.

(56) References Cited

U.S. PATENT DOCUMENTS

| | | | | |
|---|---|---|---|---|
| 5,110,769 A | * | 5/1992 | Welsh | ................... C01B 33/158 264/5 |
| 5,525,643 A | | 6/1996 | Macip-Boulis et al. | |
| 6,156,386 A | | 12/2000 | Schwertfeger | |
| 6,197,270 B1 | | 3/2001 | Sonoda et al. | |
| 2008/0081014 A1 | * | 4/2008 | Ahn | ..................... C01B 33/1585 423/338 |
| 2009/0104401 A1 | * | 4/2009 | Nakanishi | .............. C08G 77/04 428/131 |
| 2009/0247655 A1 | | 10/2009 | Kim et al. | |
| 2010/0119432 A1 | | 5/2010 | Yeo | |
| 2010/0172815 A1 | * | 7/2010 | Park | ..................... C01B 33/1585 423/338 |
| 2016/0003402 A1 | * | 1/2016 | Hidaka | ............... C01B 33/1585 252/62 |
| 2016/0010786 A1 | * | 1/2016 | Hidaka | ............... C01B 33/1585 252/62 |

FOREIGN PATENT DOCUMENTS

| | | |
|---|---|---|
| JP | 10-182261 A | 7/1998 |
| JP | 10-316414 A | 12/1998 |
| JP | 5250900 B2 | 4/2013 |

OTHER PUBLICATIONS

Extended European Search Report dated Feb. 2, 2017 for corresponding European Application No. 15774433.5.
International Search Report for corresponding International Application No. PCT/JP2015/000103 dated Apr. 7, 2015.
Form PCT/ISA/237 for corresponding International Application No. PCT/JP2015/000103 dated Apr. 7, 2015.

* cited by examiner

*Primary Examiner* — James A Fiorito
(74) *Attorney, Agent, or Firm* — Renner, Otto, Boisselle & Sklar, LLC

(57) ABSTRACT

A method for producing silica aerogel according to the present invention includes: a solation step of generating a sol by adding monoalkyltrialkoxysilane to an acidic aqueous solution containing silicic acid; and a gelation step of generating a wet gel by gelating the sol. Moreover, the production method includes a drying step of removing a solvent, which is contained in the wet gel, from the wet gel by drying the wet gel at less than a critical temperature of the solvent and at less than a critical pressure of the solvent. Then, the monoalkyltrialkoxysilane is added to the acidic aqueous solution so that an amount of silicon in the monoalkyltrialkoxysilane becomes 1 mol part or more with respect to 1 mol part of an amount of silicon in the acidic aqueous solution containing the silicic acid.

6 Claims, No Drawings

METHOD FOR PRODUCING SILICA AEROGEL

TECHNICAL FIELD

The present invention relates to a method for producing silica aerogel. In detail, the present invention relates to a method for producing silica aerogel producible in simple steps and at low cost.

BACKGROUND ART

Silica aerogel owns both of high light transmittance and thermal insulation properties and low refractive index and dielectric properties, which are as low as those of gas, and accordingly, is expected to be fully used for a variety of purposes including a transparent insulator as an example.

As a method for producing the silica aerogel as described above, for example, a method described in Patent Literature 1 is known. Patent Literature 1 discloses a method, in which a nonionic surfactant is dissolved into an acidic aqueous solution, a metal compound having a hydrolyzable functional group is added to a resultant solution, and a product thus obtained is solidified, followed by drying. Then, Patent Literature 1 describes that an inorganic porous body obtained by the method of Patent Literature 1 includes: through holes, which have a pore diameter of 200 nm or more, and continue with one another in a three-dimensional network shape; and pores, which are formed in inner wall surfaces of the through holes, and have a pore diameter ranging from 5 to 100 nm.

Here, alcogel for use in producing the silica aerogel has micropores formed in such a manner that a silicon compound is subjected to polycondensation. However, in general, capillarity applied to the micropores is increased as the pore diameter is smaller and a surface tension of a solvent is large, and accordingly, the alcogel becomes prone to be broken. As a method for avoiding this, there is considered a method of drying the alcogel under a supercritical condition using carbon dioxide. However, such drying under the supercritical condition is a high-pressure process, and accordingly, a large amount of capital investment is required for a special device and the like, and much more labor and time are also required.

Therefore, as a method of drying the alcogel more simply, there is examined a method of imparting, to the alcogel, skeleton strength exceeding the capillarity or skeleton flexibility that enables free deformation following the capillarity. Patent Literature 2 discloses a method including: a step of converting sol into gel after preparing the sol by adding a silicon compound such as methyltrimethoxysilane into an acidic aqueous solution containing a surfactant; and a step of drying the sol. Moreover, Patent Literature 2 describes that the gel is dried at a temperature and a pressure, which are those less than a critical point of the solvent for use in drying the gel.

CITATION LIST

Patent Literature

Patent Literature 1: Japanese Unexamined Patent Application Publication No. H10-182261
Patent Literature 2: Japanese Patent No. 5250900

SUMMARY OF INVENTION

However, in the method of Patent Literature 2, a cross-linking density of wet gel obtained by using the silicon compound has been insufficient in some case, and there has been a possibility that strength and rigidity of a gel skeleton may fall short to result in shrinkage of the wet gel. Therefore, a liquid medium with low surface tension, such as a fluorine-based solvent, is allowed to substitute for the solvent of the wet gel, followed by drying; however, there has been a problem that the fluorine-based solvent costs extremely much.

The present invention has been made in consideration of such a problem as described above, which is inherent in the prior art. Then, it is an object of the present invention to provide a method for producing silica aerogel, the method being capable of producing the silica aerogel in simple steps and at low cost.

A method for producing silica aerogel according to a first aspect of the present invention includes: a solation step of generating a sol by adding monoalkyltrialkoxysilane to an acidic aqueous solution containing silicic acid; and a gelation step of generating a wet gel by gelating the sol. Moreover, the production method of this embodiment includes a drying step of removing a solvent, which is contained in the wet gel, from the wet gel by drying the wet gel at less than a critical temperature of the solvent and at less than a critical pressure of the solvent. Then, the monoalkyltrialkoxysilane is added to the acidic aqueous solution so that an amount of silicon in the monoalkyltrialkoxysilane becomes 1 mol part or more with respect to 1 mol part of an amount of silicon in the acidic aqueous solution.

A method for producing silica aerogel according to a second aspect of the present invention is the production method according to the first aspect, wherein the acidic aqueous solution containing the silicic acid further contains a surfactant.

A method for producing silica aerogel according to a third aspect of the present invention is the production method according to the first or second aspect, wherein the gelation step is a step of generating the wet gel by adding a base to the sol. Alternatively, the gelation step is a step of generating the wet gel by adding, to the sol, a compound that turns the sol to be basic by hydrolysis.

A method for producing silica aerogel according to a fourth aspect of the present invention is the production method according to any one of the first to third aspects, wherein pH of the acidic aqueous solution containing the silicic acid is 3.0 or less, and the acidic aqueous solution is obtained from water glass, and an acidic cation exchange resin or an inorganic acid.

A method for producing silica aerogel according to a fifth aspect of the present invention is the production method according to any one of the first to fourth aspects, wherein the solvent is a nonpolar solvent.

A method for producing silica aerogel according to a sixth aspect of the present invention is the production method according to the fifth aspect, whereby the solvent is n-heptane.

DESCRIPTION OF EMBODIMENTS

A detailed description is made below of a process for producing silica aerogel according to embodiments of the present invention.

The process for producing silica aerogel according to the embodiments of the present invention includes: a solation step of generating a sol by adding monoalkyltrialkoxysilane to an acidic aqueous solution containing silicic acid; and a gelation step of generating a wet gel by gelating the sol. Moreover, such a production method of this embodiment includes a drying step of removing a solvent, which is contained in the wet gel, from the wet gel by drying the wet gel at less than a critical temperature of the solvent and at less than a critical pressure of the solvent. Note that, hereinafter, the "acidic aqueous solution containing silicic acid" is also referred to as an "acidic silicic acid aqueous solution".

[Solation Step]

In the production method of this embodiment, first, the monoalkyltrialkoxysilane is added to such an acidic silicic acid aqueous solution that is a raw material of the sol, and these are mixed with each other, whereby the sol is prepared. The monoalkyltrialkoxysilane is a silicon compound, which has an alkyl group that is a stable terminal group including silicon-carbon bond, and is provided with chemical properties of the alkyl group. Moreover, three silanol groups are generated in one molecule by a hydrolytic reaction of the alkoxy group, and accordingly, a crosslinking density of the wet gel can be enhanced in the gelation step to be described later.

The acidic silicic acid aqueous solution contains silicic acid in which a composition is represented by $nSiO_2 \cdot mH_2O$. That is to say, the acidic silicic acid aqueous solution contains silicic acid, for example, such as orthosilicic acid ($H_4SiO_4$), metasilicic acid (($H_2Si_2O)_n$) and disilicic acid ($H_2Si_2O_5$). The monoalkyltrialkoxysilane is added to the acidic silicic acid aqueous solution, whereby the acidic silicic acid aqueous solution acts as an acid catalyst for hydrolyzing the alkoxy group of the monoalkyltrialkoxysilane. Therefore, the monoalkyltrialkoxysilane is hydrolyzed into monoalkyltrihydroxysilane and alcohol in the acidic silicic acid aqueous solution.

In the gelation step to be described later, the generated monoalkyltrihydroxysilane causes a dehydration condensation with the silicic acid, and by the alkyl group, organically modifies surfaces of the silicic acid that becomes cores of the wet gel. As a result, as will be described later, silica aerogel, which has pores smaller than a mean free path of the air and has a low bulk density, can be obtained even if the drying is not performed under a supercritical condition.

The monoalkyltrialkoxysilane is not particularly limited as long as the monoalkyltrialkoxysilane can organically modify the surfaces of the silicic acid by the alkyl group. As the monoalkyltrialkoxysilane, for example, there are mentioned methyltrimethoxysilane, methyltriethoxysilane, ethyltrimethoxysilane, ethyltriethoxysilane, vinyltrimethoxysilane, vinyltriethoxysilane and the like. Moreover, as the monoalkyltrialkoxysilane, there are also mentioned mono-n-propyltrimethoxysilane, mono-n-propyltriethoxysilane, monohexyltrimethoxysilane, monohexyltriethoxysilane and the like. These monoalkyltrialkoxysilanes may be each used singly, or two types or more thereof may be used in combination. Note that, from viewpoints that compatibility with water in an event of producing the sol is high, and further, that a rate of a hydrolysis reaction in that event is fast, methyltrimethoxysilane is preferable as the monoalkyltrialkoxysilane.

Here, the monoalkyltrialkoxysilane is added to the acidic silicic acid aqueous solution so that an amount of silicon in the monoalkyltrialkoxysilane becomes 1 mol part or more with respect to 1 mol part of an amount of silicon in the acidic silicic acid aqueous solution. That is to say, in order that silicon in the silicic acid becomes 1 mol or more with respect to 1 mol of silicon in the monoalkyltrialkoxysilane, a mixed amount of these is adjusted. As mentioned above, the monoalkyltrihydroxysilane, which is generated by hydrolyzing the monoalkyltrialkoxysilane, organically modifies the surfaces of the silicic acid by the alkyl group. In this event, in a case where the surfaces of the silicic acid are not sufficiently modified by the alkyl group, there is a possibility that the wet gel may shrink in the drying step, resulting in an increase of the bulk density of the obtained silica aerogel.

An upper limit of such an additional amount of the monoalkyltrialkoxysilane to the acidic silicic acid aqueous solution is not particularly limited. However, in this embodiment, it is preferable to effectively suppress the shrinkage in the drying step. Therefore, it is preferable to add the monoalkyltrialkoxysilane to the acidic silicic acid aqueous solution so that the amount of silicon in the monoalkyltrialkoxysilane can be 10 mol parts or less with respect to 1 mol part of the amount of silicon in the acidic silicic acid aqueous solution. Moreover, it is preferable to add the monoalkyltrialkoxysilane to the acidic silicic acid aqueous solution so that the amount of silicon in the monoalkyltrialkoxysilane can be 2 to 5 mol parts with respect to 1 mol part of the amount of silicon in the acidic silicic acid aqueous solution.

The acidic silicic acid aqueous solution can be obtained, for example, by processing water glass by using an acidic cation exchange resin or an inorganic acid, and thereby acidifying the water glass. The water glass is a concentrated aqueous solution of sodium silicate ($Na_2O \cdot nSiO_2$, n=2 to 4), and is obtained by dissolving the sodium silicate into water, followed by heating. Then, the water glass is brought into contact with the acidic cation exchange resin, whereby $H^+$ ions are substituted for $Na^+$ ions, and the acidic silicic acid aqueous solution can be obtained. Moreover, also by adding the inorganic acid to the water glass, the acidic silicic acid aqueous solution can be obtained by releasing a weak acid.

The acidic cation exchange resin is not particularly limited; however, a sulfonic acid-type acidic cation exchange resin, which has a sulfonic acid group as an ion exchange group, can be used. As such a specific sulfonic acid-type acidic cation exchange resin, there can be exemplarily illustrated: a polystyrene-based sulfonic acid-type acidic cation exchange resin; a phenol-based sulfonic acid-type acidic cation exchange resin; a fluorine-based sulfonic acid-type acidic cation exchange resin; and the like. Moreover, the inorganic acid is not particularly limited, either; however, for example, hydrochloric acid, nitric acid, phosphoric acid, sulfuric acid, boric acid, hydrofluoric acid and the like can be exemplarily illustrated.

It is preferable that pH of the acidic silicic acid aqueous solution be 3.0 or less. That is to say, it is preferable that pH of the acidic silicic acid aqueous solution be 3.0 or less, and that the acidic silicic acid aqueous solution be obtained from the water glass and the acidic cation exchange resin or the inorganic acid. By the fact that pH of the acidic aqueous solution is 3.0 or less, the acidic aqueous solution can effectively act as an acid catalyst for hydrolyzing the alkoxy group of the monoalkyltrialkoxysilane.

A concentration of the silicic acid in the above-described acidic silicic acid aqueous solution is not particularly limited if fluidity thereof for being mixed with the monoalkyltrialkoxysilane can be ensured; however, for example, can be set to 3 to 15% by mass.

In this embodiment, the acidic silicic acid aqueous solution may further contain a surfactant. The monoalkyltrialkoxysilane is hydrolyzed as mentioned above, and thereafter, in the gelation step, a three-dimensional network structure of siloxane is formed while maintaining the alkyl group by polycondensation. In this event, by the fact that the surfactant is present, a difference in chemical affinity between the solvent in such a reaction system and a growing siloxane polymer can be reduced, and a tendency of phase separation induced by a polymerization reaction can be suppressed. Then, the tendency of the phase separation is suppressed, whereby the pores in the aerogel solidified by sol-gel transition become finer, and it becomes possible to maintain phase separation of a mesoscopic level.

As the surfactant, at least either one of a nonionic surfactant and an ionic surfactant can be used. Moreover, as the ionic surfactant, at least any one of a cationic surfactant, an anionic surfactant and an amphoteric surfactant can be used. However, in this embodiment, it is preferable to use the cationic surfactant or the anionic surfactant.

As the nonionic surfactant, for example, one can be used, which contains a hydrophilic portion such as polyoxyethylene and a hydrophobic portion composed of the alkyl group. Moreover, as the nonionic surfactant, one that contains polyoxypropylene as a hydrophilic portion can also be used. As the surfactant that contains the hydrophilic portion such as the polyoxyethylene and the hydrophobic portion composed of the alkyl group, for example, there are mentioned polyoxyethylene nonylphenyl ether, polyoxyethylene octylphenyl ether and polyoxyethylene alkyl ether. As the surfactant that contains polyoxypropylene as the hydrophilic portion, for example, there are mentioned polyoxypropylene alkyl ether, a block copolymer of polyoxyethylene and polyoxypropylene, and the like.

Moreover, as the cationic surfactant, for example, cetyltrimethylammonium bromide, cetyltrimethylammonium chloride and the like are mentioned. As the anionic surfactant, for example, sodium dodecyl sulfonate and the like are mentioned.

As the amphoteric surfactant, for example, an amino acid-based one, a betaine-based one and an amine oxide-based one and the like are mentioned. As the amino acid-based surfactant, for example, acyl glutamic acid and the like are mentioned. As the betaine-based surfactant, for example, lauryldimethylaminoacetic acid betaine, stearyldimethylaminoacetic acid betaine and the like are mentioned. As the amine oxide-based surfactant, for example, lauryldimethylamine oxide and the like are mentioned.

Each type of the above-mentioned surfactants may be used singly, or two types or more thereof may be used in combination. Moreover, it is preferable to appropriately adjust an additional amount of the surfactant based on the type of the surfactant and a type and amount of the monoalkyltrialkoxysilane. The additional amount of the surfactant is set to 0.1 to 10.0 g, preferably 0.5 to 6.0 g with respect to the monoalkyltrialkoxysilane.

A preparation method of the sol in the solation step is not particularly limited. As the preparation method, for example, a predetermined amount of the acidic silicic acid aqueous solution is poured into a reaction device that is attached with a hermetically sealed container and a hermetically sealed-type agitator, the monoalkyltrialkoxysilane is added thereto, and the surfactant is added thereto according to needs, followed by sufficient agitation. Note that an order of adding the surfactant is not particularly limited, and for example, the monoalkyltrialkoxysilane may be added to the acidic silicic acid aqueous solution after the surfactant is added thereto. Moreover, the surfactant may be added to the acidic silicic acid aqueous solution after the monoalkyltrialkoxysilane is added thereto. Furthermore, the surfactant and the monoalkyltrialkoxysilane may be added simultaneously to the acidic silicic acid aqueous solution.

[Gelation Step]

In the production method of this embodiment, the sol obtained in the above-mentioned gelation step is gelated, and the wet gel is generated. Such a method of gelating the above-described sol is not particularly limited; however, the wet gel can be generated, for example, by adding a base to the sol and gelating the sol.

As the base for gelating the sol, for example, ammonia water can be used from viewpoints that volatility thereof is high, and further, that the base is less likely to remain in the obtained wet gel. In this event, it is preferable that a concentration of the ammonia water be low, and it is preferable to set the concentration, for example, to 0.01 to 1 mol/L. Such low-concentrated ammonia water is added to the sol, whereby pH of the sol is gradually increased, and it becomes possible to cause a gelation reaction substantially uniformly.

Besides the above-mentioned one, as the method of gelating the above-described sol, for example, a compound that turns the sol to be basic by hydrolysis is added to the sol, whereby the sol can be gelated, and the wet gel can be generated.

The compound that turns the sol to be basic by the hydrolysis is not particularly limited; however, for example, urea can be mentioned as the compound. Moreover, as the compound, there are also mentioned: acid amide such as formamide, N-methylformamide, N,N-dimethylformamide, acetamide, N-methylacetamide, and N,N-dimethylacetamide; and hexamethylene tetramine that is a nitrogen cyclic compound. Furthermore, one can also be used in a similar way, the one generating a compound such as hydrofluoric acid, which promotes the gelation, by a decomposition reaction. Note that, with regard to the compound that turns the sol to be basic, each type thereof may be used singly, or two types or more thereof may be used in combination.

It is preferable to adjust an additional amount of the compound, which turns the sol to be basic, based on the type of the compound. In a case of using urea as the compound, the additional amount of urea is set to preferably 0.1 to 20.0 g, more preferably 0.2 to 15.0 g with respect to 10 g of the monoalkyltrialkoxysilane. The additional amount of urea is within this range, whereby a sufficient amount of ammonia can be generated at the time of the hydrolysis, and it becomes possible to perform the gelation efficiently.

Moreover, in order to promote a hydrolysis reaction of the compound that turns the sol to be basic, the sol with which the compound is mixed may be heated. Note that it is necessary to adjust a heating temperature based on the type of the compound. In the case of using urea as the compound, it is preferable to heat the sol within a range of 50 to 200° C. Moreover, it is preferable that a pH value of the sol after the heating become 9.0 to 11.0.

In the gelation step of this embodiment, as mentioned above, the base is added, or the compound that turns the sol to be basic by the hydrolysis is added, whereby the sol is turned to be basic. In this event, it is preferable to place the sol under a hermetically sealed condition, and to suppress volatilization and decomposition of substances in the sol. In such a way, on the surfaces of the silicic acid, the monoalkyltrihydroxysilane is subjected to dehydration condensation, and it becomes easy for the alkyl group to be organically modified on the surfaces. Moreover, the organically modified silicic acid and the remaining monoalkyltrihydroxysilane are condensed, and it becomes easy to invert the sol into such gel separated into a solvent-rich phase and a skeleton phase.

Here, the sol, which lost the fluidity by causing the sol-gel transition as mentioned above, has a fine unreacted region in the generated network structure. Therefore, in order to reduce the unreacted region, it is preferable to age the gel by applying appropriate temperature and time according to needs. The aging of the gel is a reaction to gradually and finely complete the network in the reacted region under conditions of thermal oscillations and solvent coexistence. Note that it is preferable to perform the aging by leaving the gel standing within the same temperature range as that when the sol-gel reaction is caused. Moreover, in such an aging process, it is preferable to place the gel under the hermetically sealed condition, and to suppress volatilization and decomposition of substances in the gel.

It is preferable to perform the above-mentioned aging processing, for example, under conditions where a heating temperature is 50 to 200° C. and a heating time is 2 hours or more. That is to say, the time required for the aging is changed depending on a size and volume of the pores of the wet gel, and accordingly, it is preferable to set the time to a shortest processing time or more, during which the pore structure comes not to be substantially changed.

[Drying Step]

In the production method of this embodiment, the solvent is removed from the wet gel obtained in the above-mentioned gelation step. The wet gel is dried as described above, whereby such desired silica aerogel can be obtained.

Here, it is heretofore known that capillarity applied to pores of alcogel is increased as a pore dimeter thereof is smaller and surface tension of a solvent is larger, resulting in that the gel becomes easily breakable. Therefore, in Patent Literature 2, a solvent with low surface tension, such as a fluorine-based solvent, is substituted for the solvent, followed by drying. However, as mentioned above, the wet gel according to this embodiment is synthesized from the monoalkyltrialkoxysilane and the silicic acid sol, and has the alkyl group in the inside. Therefore, the wet gel is provided with skeleton strength exceeding the capillarity and/or skeleton flexibility that enables free deformation following the capillarity, and accordingly, the wet gel can be dried without using the solvent with low surface tension, such as the fluorine-based solvent.

In this embodiment, first, solvent substitution of the wet gel is performed in order to remove moisture, the surfactant, the compound turning the sol to be basic, and the unreacted monoalkyltrialkoxysilane, silicic acid sol and the like, those which remain in the wet gel obtained in the gelation step. A polar solvent can be used as the solvent to be substituted, and for example, alcohols and water can be used.

Next, for the wet gel subjected to the solvent substitution, it is preferable to perform such solvent substitution by using another solvent. That is to say, it is preferable to substitute a solvent, which has lower polarity than the polar solvent in the wet gel, for the polar solvent in the wet gel. Such a low-polar solvent as described above is substituted, whereby the shrinkage of the wet gel at the drying time can be further suppressed.

For example, the solvent substitution can be performed by immersing the wet gel, which is obtained in the gelation step, into the solvent to be substituted. In this event, the solvent may be heated according to needs, or may be returned.

As the polar solvent, for example, there can be used a solvent in which an $E_T^N$ value known as a parameter that represents the polarity of the solvent is 0.70 or more. As such a solvent, for example, methanol and water can be mentioned. Note that, with regard to the polar solvent, one type thereof may be used singly, or two or more types thereof may be used in combination.

Moreover, as the low-polar solvent, for example, there can be used a solvent in which an $E_T^N$ value is 0.55 or less. As such a solvent, for example, there can be mentioned: a hydrocarbon-based solvent and an organic silicon-based solvent such as hexane, heptane, isopropyl alcohol (IPA), hexamethyldisiloxane (HMDSO) and methyl-tert-butylether (MTBE). Note that, as the low-polar solvent, it is more preferable to use a nonpolar solvent in which an $E_T^N$ value is 0.03 or less, and n-heptane is particularly preferable. Note that, also with regard to the low-polar solvent, one type thereof may be used singly, or two or more types thereof may be used in combination.

Next, the wet gel, which is subjected to the solvent substitution by the polar solvent or the low-polar solvent as mentioned above, is dried, and the solvent is removed from the wet gel. In this event, the wet gel is dried at less than the critical temperature and critical pressure of the solvent contained in the wet gel. That is to say, in such a case where a liquid dispersion medium (solvent) of the wet gel is the polar solvent, the wet gel is dried at less than the critical temperature and critical pressure of the polar solvent. Moreover, in such a case where the liquid dispersion medium of the wet gel is the low-polar solvent, the wet gel is dried at less than the critical temperature and critical pressure of the low-polar solvent. As mentioned above, the wet gel according to this embodiment is provided with the skeleton strength exceeding the capillarity and/or the skeleton flexibility that enables the free deformation following the capillarity. Therefore, even in the case of drying the wet gel at less than the critical temperature and critical pressure of the solvent, the shrinkage and breakage of the wet gel can be suppressed. Note that a drying condition of the wet gel differs depending on the type of the solvent contained in the wet gel; however, for example, is preferably set within a range of 120 to 200° C. under the atmospheric pressure.

The solvent is removed from the wet gel as described above, whereby the silica aerogel according to this embodiment can be obtained. The obtained silica aerogel is formed of: the through holes which continue with one another in the network shape three-dimensionally; and the skeleton composed of the silicic acid in which the surfaces of the gel walls are covered with the alkyl group, the skeleton continuing in the three-dimensional network shape.

Here, as mentioned above, the skeleton in the silica aerogel of this embodiment is obtained by the condensation of the silicic acid represented by $nSiO_2 \cdot mH_2O$ and the monoalkyltrihydroxysilane represented by $RSi(OH)_3$ (R: alkyl group). Therefore, the skeleton of the silica aerogel includes: a tetrafunctional type silicate ($SiO_2$), which is caused by the silicic acid and is called a Q unit: and organosilsesquioxane ($RSiO_{1.5}$), which is caused by the monoalkyltrihydroxysilane and is called a T unit. Then, the skeleton forms a Q3 structure, in which the silicate is bonded to three atoms of neutral oxygen and one hydroxyl group, and a Q4 structure, in which the silicate is bonded to four atoms of the neutral oxygen, and further, forms T2, in which the organosilsesquioxane is bonded to two atoms of the neutral oxygen and one hydroxyl group, and T3, in which the organosilsesquioxane is bonded to three atoms of the neutral oxygen. Moreover, as mentioned above, the silica aerogel includes the alkyl group in the skeleton. Therefore, it becomes possible to form such a skeleton provided with appropriate strength and flexibility.

Moreover, the silica aerogel obtained as mentioned above has the three-dimensional network structure in the mesoscopic range (range of 1 nm to 100 nm). A pore diameter of the through holes which continue in the three-dimensional network shape can be set to 5 nm to 100 nm, and more preferably, is set to 20 nm to 35 nm. Moreover, a diameter of a cross section of the skeleton can be set to 2 nm to 25 nm, and more preferably, is set to 3 nm to 7 nm.

As described above, the method for producing silica aerogel according to this embodiment includes: the solation step of generating the sol by adding the monoalkyltrialkoxysilane to the acidic aqueous solution containing the silicic acid; and the gelation step of generating the wet gel by gelating the sol. Moreover, the production method of this embodiment includes the drying step of removing the solvent, which is contained in the wet gel, from the wet gel by drying the wet gel at less than the critical temperature of the solvent and at less than the critical pressure of the solvent. Then, the monoalkyltrialkoxysilane is added to the above-described acidic aqueous solution so that the amount of silicon in the monoalkyltrialkoxysilane becomes 1 mol part or more with respect to 1 mol part of the amount of silicon in the acidic aqueous solution containing the silicic acid.

In such a production method of this embodiment as described above, the drying under the supercritical condition, which has been necessary in the conventional production method, becomes unnecessary, and accordingly, it becomes possible to simplify the production process, and also to simplify the equipment. Moreover, it is not necessary to use the fluorine-based solvent as the drying solvent as in Patent Literature 2, either, and accordingly, the production cost can be suppressed, and further, an influence to the environment can also be reduced.

Moreover, in a case of using only the monoalkyltrialkoxysilane as a raw material of the silica aerogel, then the production cost is increased since the monoalkyltrialkoxysilane is expensive. However, in this embodiment, the acidic silicic acid aqueous solution derived from the inexpensive water glass is substituted for a part of the monoalkyltrialkoxysilane as a raw material, and accordingly, it becomes possible to reduce the production cost.

Moreover, in the production method of this embodiment, the acidic silicic acid aqueous solution and the monoalkyltrialkoxysilane are used, and the silicic acid sol and the compound having the alkyl group are bonded to each other at the level of a molecule. That is to say, the gel wall surfaces of the wet gel are covered with the alkyl group derived from the monoalkyltrialkoxysilane. Therefore, in the event of drying this wet gel, a volume thereof can be suppressed from being shrunk, and silica aerogel, in which a bulk density is small and a mean pore diameter is small, can be produced. Moreover, the alkyl group is present in the skeleton molecule, and accordingly, silica aerogel, which strikes a balance between high rigidity and high flexibility, can be formed. Furthermore, the silica aerogel has pores smaller than the mean free path of the air, and further, the bulk density thereof is low. Therefore, the silica aerogel is excellent in heat insulation performance, and can be preferably used for heat insulators in architectural fields, home appliances and industrial facilities, and the like. Moreover, the silica aerogel can be preferably used also for catalyst supports and the like besides the heat insulators.

EXAMPLES

A description is made below in more detail of the present invention by examples and comparative examples; however, the present invention is not limited to these examples.

Example 1

First, a sodium water glass solution, in which a $SiO_2$ content was 6% by mass and a ratio of $Na_2O:SiO_2$ was 1:3, was prepared. Then, 1 L of the sodium water glass solution was allowed to pass through a column filled with 0.5 L of strongly acidic cation exchange resin, whereby acidic silicic acid sol was obtained. In this event, pH of the flowing-out solution was 1.5. Here, Amberlite (registered trademark) made by Organo Corporation was used as the strongly acidic cation exchange resin.

Next, into 10 g of the obtained acidic silicic acid sol, as a surfactant, there was dissolved 0.50 g of cetyltrimethylammonium chloride (also known as: hexadecyltrimethylammonium chloride) made by Nacalai Tesque, Inc. Moreover, 3.00 g of urea made by Nacalai Tesque, Inc. was dissolved into the silicic acid sol mixed with the surfactant, whereby a mixed solution was prepared.

Thereafter, to the mixed solution, as a silicon compound, there was added 5.0 mL of methyltrimethoxysilane (hereinafter, abbreviated as "MTMS"), followed by agitation for 30 minutes, whereby a hydrolysis reaction of MTMS was caused to generate sol. Note that, as methyltrimethoxysilane, reagent name KBM-13 (specific gravity: 0.95) made by Shin-Etsu Chemical Co., Ltd. was used. Then, the generated sol was left standing at 60° C. in a hermetically sealed container, and was gelated. The gel was aged by being left standing continuously for 96 hours, whereby a gel-like compound was obtained.

Moreover, the solvent substitution was performed as follows for the obtained gel-like compound. First, the gel-like compound was immersed into water of 60° C. for 12 hours. Subsequently, the gel-like compound was immersed into methanol of 60° C. for 2 hours. Thereafter, a step of replacing methanol by new methanol and immersing the gel-like compound at 60° C. for 6 hours was performed twice.

Then, the gel-like compound in which methanol was substituted as the solvent was immersed into heptane of 60° C. for 2 hours. Thereafter, a step of replacing heptane by new heptane and immersing the gel-like compound at 60° C. for 6 hours was performed twice. The gel-like compound in which heptane was substituted as the solvent was dried at 120° C. for 12 hours under the atmospheric pressure, whereby silica aerogel particles of this example was obtained.

As a result of evaluating the silica aerogel particles, a bulk density thereof was 0.15 g/cm$^3$, a thermal conductivity thereof was 0.012 W/(m·K), and a mean particle diameter thereof was 1000 μm.

Example 2

First, in a similar way to Example 1, acidic silicic acid sol was prepared. Next, 0.50 g of cetyltrimethylammonium chloride of Example 1 was dissolved into 10 g of the obtained acidic silicic acid sol, whereby a mixed solution was prepared.

Moreover, to the mixed solution, there was added 5.0 mL of methyltrimethoxysilane of Example 1, followed by agitation for 30 minutes, whereby a hydrolysis reaction of MTMS was caused to generate sol. Then, 2.5 g of ammonia water with a concentration of 0.1 mol/L was added to the generated sol, and the generated sol was gelated. Thereafter, the gel was aged by being left standing at 60° C. for 96 hours, whereby a gel-like compound was obtained.

Next, the solvent substitution was performed for the obtained gel-like compound in a similar way to Example 1. Then, the gel-compound in which heptane was substituted as the solvent was dried at 120° C. for 12 hours under the atmospheric pressure, whereby silica aerogel particles of this example were obtained.

As a result of evaluating the silica aerogel particles, a bulk density thereof was 0.15 g/cm$^3$, a thermal conductivity thereof was 0.012 W/(m·K), and a mean particle diameter thereof was 1000 µm.

Example 3

First, a gel-like compound was prepared in a similar way to Example 1. Moreover, the solvent substitution was performed as follows for the obtained gel-like compound. First, the gel-like compound was immersed into water of 60° C. for 12 hours. Subsequently, the gel-like compound was immersed into methanol of 60° C. for 2 hours. Thereafter, a step of replacing methanol by new methanol and immersing the gel-like compound at 60° C. for 6 hours was performed twice.

Then, the gel-like compound in which methanol was substituted as the solvent was immersed into isopropyl alcohol of 60° C. for 2 hours. Thereafter, a step of replacing isopropyl alcohol by new isopropyl alcohol and immersing the gel-like compound at 60° C. for 6 hours was performed twice. Then, the gel-compound in which isopropyl alcohol was substituted as the solvent was dried at 120° C. for 12 hours under the atmospheric pressure, whereby silica aerogel particles of this example were obtained.

As a result of evaluating the silica aerogel particles, a bulk density thereof was 0.20 g/cm$^3$, a thermal conductivity thereof was 0.020 W/(m·K), and a mean particle diameter thereof was 1000 µm.

Comparative Example 1

Silica aerogel particles of this example were obtained in a similar way to Example 1 except that the additional amount of methyltrimethoxysilane to the mixed solution was set to 1.2 mL. As a result of evaluating the silica aerogel particles, a bulk density thereof was 0.29 g/cm$^3$, a thermal conductivity thereof was 0.030 W/(m·K), and a mean particle diameter thereof was 1000 µm.

As mentioned above, in Examples 1 to 3, MTMS was added so that the amount of silicon in MTMS could become 3.5 mol parts with respect to 1 mol part of the amount of silicon in the acidic silicic acid sol. Therefore, there was obtained the silica aerogel in which the bulk density was 0.20 g/cm$^3$ or less and the thermal conductivity was also 0.020 W/(m·K) or less, the silica aerogel being lightweight and excellent in thermal insulation properties. In contrast, in Comparative example 1, MTMS was added so that the amount of silicon in MTMS could become 0.8 mol part with respect to 1 mol part of the amount of silicon in the acidic silicic acid sol. Therefore, the surfaces of the silicic acid were not able to be organically modified by the alkyl group sufficiently, resulting in that the wet gel shrank, and silica aerogel in which the bulk density was high was formed.

Moreover, in Examples 1 and 2, heptane is used as the drying solvent of the wet gel. Therefore, it became possible to further reduce the bulk density in comparison with Example 3 using isopropyl alcohol.

The entire contents of Japanese Patent Application No. 2014-070750 (filed on: Mar. 31, 2014) are incorporated herein by reference.

The description has been made above of the contents of the present invention along the embodiments; however, it is self-obvious for those skilled in the art that the present invention is not limited to the description of these, and is modifiable and improvable in various ways.

INDUSTRIAL APPLICABILITY

In accordance with the method for producing silica aerogel according to the present invention, the drying under the supercritical condition becomes unnecessary, and accordingly, it becomes possible to simplify the production process, and also to simplify the equipment. Moreover, it is not necessary to use the fluorine-based solvent as the drying solvent, either, and accordingly, the production cost can be suppressed. Furthermore, the acidic silicic acid aqueous solution derived from the inexpensive water glass is substituted for a part of the raw material, and accordingly, it becomes possible to reduce the production cost.

The invention claimed is:

1. A method for producing silica aerogel, the method comprising:
    a solation step of generating a sol by adding monoalkyltrialkoxysilane to an acidic aqueous solution containing silicic acid;
    a gelation step of generating a wet gel by gelating the sol, the wet gel comprising a gel skeleton-phase and a solvent-rich liquid-phase;
    a substitution step, comprising:
        (i) substituting the solvent-rich liquid-phase with a polar solvent in which an $E_T^N$ value is 0.70 or more, and then
        (ii) substituting the polar solvent with a low-polar solvent in which the $E_T^N$ value is 0.55 or less, the low-polar solvent comprising a hydrocarbon solvent, an organic silicon solvent, or a combination thereof; and
    a drying step of removing the low-polar solvent contained with the gel skeleton-phase, in which the drying step includes drying at less than a critical temperature of the low-polar solvent and at less than a critical pressure of the low-polar solvent;
    wherein the monoalkyltrialkoxysilane is added to the acidic aqueous solution so that an amount of silicon in the monoalkyltrialkoxysilane becomes 1 mol part or more with respect to 1 mol part of an amount of silicon in the acidic aqueous solution.

2. The method for producing silica aerogel according to claim 1, wherein the acidic aqueous solution further contains a surfactant.

3. The method for producing silica aerogel according to claim 1, wherein the gelation step is a step of generating the wet gel by adding a base to the sol, or is a step of generating the wet gel by adding, to the sol, a compound that turns the sol to be basic by hydrolysis.

4. The method for producing silica aerogel according to claim 1, wherein pH of the acidic aqueous solution is 3.0 or less, and the acidic aqueous solution is obtained from water glass, and an acidic cation exchange resin or an inorganic acid.

5. The method for producing silica aerogel according to claim 1, wherein the low-polar solvent is a nonpolar solvent.

6. The method for producing silica aerogel according to claim 5, wherein the low-polar solvent is n-heptane.

* * * * *